No. 767,424. PATENTED AUG. 16, 1904.
M. NORDEN & L. S. CRANDALL.
CARD OR TICKET FOR ACTUATING THE MECHANISM CONTROLLING
ELECTRIC LIGHT SIGNS.
APPLICATION FILED MAR. 13, 1902. RENEWED MAY 7, 1904.
NO MODEL.

Witnesses:
J. Staib
Chas H Smith

Inventors:
Mortimer Norden
Lucien S. Crandall
per L. W. Serrell & Son atty

No. 767,424. Patented August 16, 1904.

UNITED STATES PATENT OFFICE.

MORTIMER NORDEN AND LUCIEN S. CRANDALL, OF BROOKLYN, NEW YORK.

CARD OR TICKET FOR ACTUATING THE MECHANISM CONTROLLING ELECTRIC-LIGHT SIGNS.

SPECIFICATION forming part of Letters Patent No. 767,424, dated August 16, 1904.

Application filed March 13, 1902. Renewed May 7, 1904. Serial No. 206,934. (No model.)

*To all whom it may concern:*

Be it known that we, MORTIMER NORDEN, residing in the borough of Manhattan, and LUCIEN S. CRANDALL, residing in the borough of Brooklyn, in the city and State of New York, citizens of the United States, have invented an Improvement in Cards or Tickets for Actuating the Mechanism Controlling Electric-Light Signs, of which the following is a specification.

Our invention relates to a card or ticket carrying a predetermined number and having a detachable check end with a corresponding number and adapted for controlling the operation of illuminated electric-light signs formed of monograms of lamps. In an application of corresponding date herewith such card or ticket is shown, as well as the mechanism for illuminating the monograms of lamps, and which mechanism is controlled thereby.

The card or ticket is arranged with a number having one or more digits, and there is a corresponding number upon the detachable check connected with the ticket. A predetermined series of apertures are made in the ticket, according to the number printed thereon. We prefer to employ at least one aperture or perforation in a row for each digit of the number, and where there are two or more digits in the number the perforations are in groups with at least one in each group or row. The main portion of the ticket in which the perforations are made is usually and preferably plain or without any matter that bears any relation to the digits or perforations, and said card or ticket preferably has one of its advancing corners cut off to insure placing the same in the proper position in the mechanism.

Figure 1:
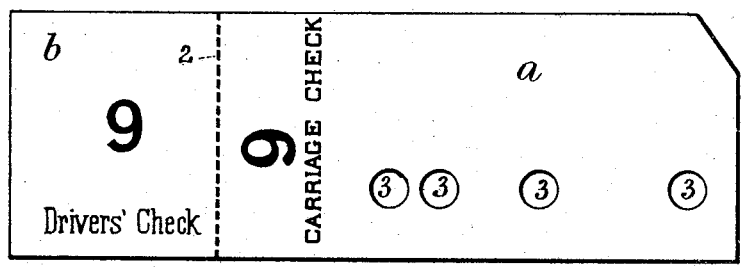
Figure 2:
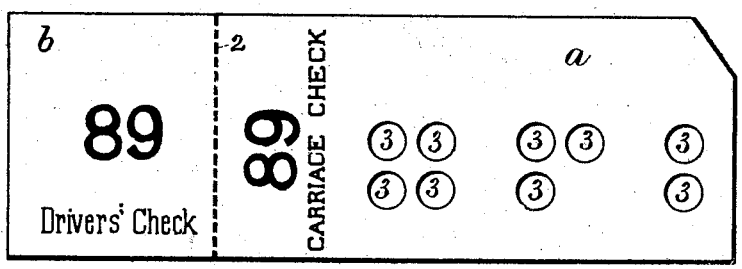

In the drawings, Figures 1 and 2 represent by elevations cards or tickets made according to our invention, the same in Fig. 1 being represented with one numeral and in Fig. 2 with two numerals.

*a* represents the card or ticket, and *b* the detachable check end separable upon the dotted, pressed, or perforated line 2. The card *a* and the detachable check *b* are provided with corresponding numbers. Those in Fig. 1 are provided with the number "9," and those in Fig. 2 with the number "89." The card or ticket *a* in both figures is marked with the words "Carriage check," and the detachable check end in both figures is marked with the words "Driver's check." These numbers and words are illustrative of the correspondence of the separable parts and of their uses.

The card or check *a* is to be provided with a series of predetermined perforations in groups indicative of the number printed thereon. These are shown in Figs. 1 and 2 by the numeral 3, and in the mechanism in which the ticket is employed these perforations provide for the action and electrical connection of circuit-wires and circuit-selectors in groups, and they predetermine the groups to be employed, the ticket forming an insulating medium or septum between parts not intended to be employed.

In illustrating the use of the device according to the words as shown thereon a person hires a coach and therein goes to a theater or other public place of entertainment. On alighting a party provided for the purpose hands the occupant of the carriage the carriage-check and the driver the driver's check, separating or detaching the one from the other in so doing. The driver retains the check as an indication of his number, and the patron of the place of amusement after the performance is over hands the check to an operator of an illumniated electric sign or monogram of lamps. The ticket is placed in the machine and the machine operated, and the number corresponding with the number thereon is illuminated in the street, and the driver watching the sign notes when his number is called and at once proceeds to drive up to the entrance for the patron who is to return in his vehicle.

It is obvious that there are many equivalent and similar uses to which these tickets and the mechanism operated thereby may be employed, as the one hereinbefore recited is simply illustrative of the use of the device as shown in the drawings.

The upper right-hand corner of the card or ticket is cut off to insure placing the ticket right side up in the machine; otherwise there would be nothing to indicate which was the upper edge or which the lower edge of the ticket.

We claim as our invention—

1. A card or ticket carrying a number and provided with at least one aperture for each digit of the number and having a detachable check with a number thereon corresponding to the number upon the card or ticket.

2. A card or ticket carrying a number and having one corner cut away, there being apertures through said card or ticket indicative of the number thereon, and a detachable check end with a number thereon corresponding to the number upon the card or ticket, substantially as and for the purposes set forth.

3. A device for operating electric-light signs, comprising a card or ticket carrying a number and having perforations arranged in groups with at least one perforation in each group for each digit of the number for actuating the mechanism controlling the sign and a detachable check end with a number thereon corresponding to the number upon the card or ticket.

4. A card or ticket carrying a number and having the main portion thereof blank and provided with at least one aperture for each digit of the number through the blank portion and having a detachable check with a number thereon corresponding to the number upon the card or ticket.

5. A card or ticket carrying a number and provided with a row of perforations for each digit of the number and having a detachable check with a number thereon corresponding to the number upon the card or ticket.

6. A card or ticket carrying a number and provided with a predetermined number of apertures for each digit of the number and having a detachable check with a number thereon corresponding to the number upon the card or ticket.

7. A card or ticket carrying a number and having the main portion thereof blank and provided with at least one aperture for each digit of the number through the blank portion and having a detachable check with a number thereon corresponding to the number upon the card or ticket and having a portion of the edge removed for the purpose specified.

8. A card or ticket carrying a number and having the main portion devoid of printed matter that appertains to the uses of the ticket, and provided with at least one aperture for each digit of the number through the said portion and having a detachable check with a number thereon corresponding to the number upon the card or ticket.

Signed by us this 8th day of March, 1902.

MORTIMER NORDEN.
LUCIEN S. CRANDALL.

Witnesses:
GEO. T. PINCKNEY,
S. T. HAVILAND.